(12) United States Patent
Duraisamy et al.

(10) Patent No.: US 9,140,489 B2
(45) Date of Patent: Sep. 22, 2015

(54) POWER SAVINGS APPARATUS FOR TRANSPORT REFRIGERATION SYSTEM, TRANSPORT REFRIGERATION UNIT, AND METHODS FOR SAME

(75) Inventors: Suresh Duraisamy, Liverpool, NY (US); Kenneth Cresswell, Cazenovia, NY (US)

(73) Assignee: CARRIER CORPORATION, Farmington, CT (US)

( * ) Notice: Subject to any disclaimer, the term of this patent is extended or adjusted under 35 U.S.C. 154(b) by 882 days.

(21) Appl. No.: 13/389,030

(22) PCT Filed: Aug. 6, 2010

(86) PCT No.: PCT/US2010/044718
§ 371 (c)(1),
(2), (4) Date: Feb. 6, 2012

(87) PCT Pub. No.: WO2011/019607
PCT Pub. Date: Feb. 17, 2011

(65) Prior Publication Data
US 2012/0137713 A1    Jun. 7, 2012

Related U.S. Application Data

(60) Provisional application No. 61/232,624, filed on Aug. 10, 2009.

(51) Int. Cl.
*G05D 23/19*    (2006.01)
*F25D 29/00*    (2006.01)
(Continued)

(52) U.S. Cl.
CPC ............... *F25D 29/003* (2013.01); *B60P 3/20* (2013.01); *B60H 1/00014* (2013.01); *F25B 2500/18* (2013.01); *F25B 2700/21172* (2013.01); *F25B 2700/21173* (2013.01)

(58) Field of Classification Search
CPC .. B60P 3/20; B60H 1/00014; B60H 1/00878; B60H 2001/00878; F25D 29/003
USPC .................. 62/126, 129, 132, 157, 231, 239; 165/200
See application file for complete search history.

(56) References Cited

U.S. PATENT DOCUMENTS

| 4,494,382 A | 1/1985 | Raymond |
| 4,913,714 A | 4/1990 | Ogura et al. |

(Continued)

FOREIGN PATENT DOCUMENTS

| CN | 1247969 A | 3/2000 |
| CN | 1376883 A | 10/2002 |

(Continued)

OTHER PUBLICATIONS

International Search Report and Written Opinon mailed Feb. 7, 2011.
(Continued)

*Primary Examiner* — Jonathan Bradford
(74) *Attorney, Agent, or Firm* — Cantor Colburn LLP (57) ABSTRACT

Embodiments of systems, apparatus, and/or methods can control conditions such as temperature within a container of a transport refrigeration system. Embodiments can include a controller for controlling the transport refrigeration system to reduce power consumption. Embodiments of systems, apparatus, and/or methods for operating the same can control cycling of a transport refrigeration unit to conserve power where a subsequent cycle time in a power savings mode is based on at least one previous cycle time. In addition, components can be enabled based on monitored conditions to reduce power consumption.

19 Claims, 5 Drawing Sheets

(51) Int. Cl.
*B60P 3/20* (2006.01)
*B60H 1/00* (2006.01)

(56) References Cited

U.S. PATENT DOCUMENTS

| | | |
|---|---|---|
| 5,303,560 A | 4/1994 | Hanson et al. |
| 5,454,230 A | 10/1995 | Janke et al. |
| 5,598,718 A | 2/1997 | Freund et al. |
| 6,044,651 A | 4/2000 | Reason et al. |
| 6,131,400 A | 10/2000 | Seok et al. |
| 6,148,628 A | 11/2000 | Reason et al. |
| 6,318,100 B1 | 11/2001 | Brendel et al. |
| 6,405,550 B1 | 6/2002 | Reason et al. |
| 6,543,242 B2 | 4/2003 | Reason et al. |
| 6,845,627 B1 | 1/2005 | Buck |
| 7,043,927 B2 | 5/2006 | Burchill et al. |

FOREIGN PATENT DOCUMENTS

| | | |
|---|---|---|
| CN | 101118079 A | 2/2008 |
| JP | 1119412 | 5/1989 |
| JP | 10002624 | 1/1998 |

OTHER PUBLICATIONS

Chinese First Office Action and Search Report for application 201080035588.4, mailed Dec. 19, 2013, 8 pages.

European Search Report for application EP 10808560.6, dated Jul. 23, 2015, 7 pages.

POWER SAVINGS APPARATUS FOR TRANSPORT REFRIGERATION SYSTEM, TRANSPORT REFRIGERATION UNIT, AND METHODS FOR SAME

CROSS REFERENCE TO RELATED APPLICATION

This application claims priority to U.S. Provisional Patent Application No. 61/232,624 entitled "Power Savings Apparatus For Transport Refrigeration System, Transport Refrigeration Unit, And Methods For Same," filed on Aug. 10, 2009. The content of this application is incorporated herein by reference in its entirety.

FIELD OF THE INVENTION

This invention relates generally to the field of transport refrigeration systems and methods of operating the same.

BACKGROUND OF THE INVENTION

A particular difficulty of transporting perishable items is that such items must be maintained within a temperature range to reduce or prevent, depending on the items, spoilage, or conversely damage from freezing. A transport refrigeration unit is used to maintain proper temperatures within a transport cargo space. The transport refrigeration unit can be under the direction of a controller. The controller ensures that the transport refrigeration unit maintains a certain environment (e.g. thermal environment) within the transport cargo space.

SUMMARY OF THE INVENTION

In view of the background, it is an object of the application to provide a transport refrigeration system, transport refrigeration unit, and methods of operating same that can maintain cargo quality by selectively controlling transport refrigeration system components with reduced power consumption.

One embodiment according to the application can include a control module for a transport refrigeration system. The control module includes a controller for controlling the transport refrigeration system to reduce power consumption. The controller can control cycling of a transport refrigeration unit to conserve power where a subsequent cycle time is based on a previous cycle time.

In an aspect of the invention, a transport refrigeration unit includes a refrigeration module operatively coupled to an enclosed volume. The refrigeration module to include a supply port to output air to said enclosed volume at a supply temperature, a return port to return air from said enclosed volume to the refrigeration module at a return temperature, at least one component configured to operate in a first cooling mode and an economy mode, and a controller to change a length of a subsequent interval for said at least one component in said economy mode based on at least one previous interval of said at least one component in said economy mode.

In an aspect of the invention, a computer program product includes a computer usable storage medium to store a computer readable program that, when executed on a computer, causes the computer to perform operations to operate a transport refrigeration unit, the operations to include operate the transport refrigeration unit in a power savings mode for a first period, switch the transport refrigeration unit to operate in a first mode, and operate the transport refrigeration unit in the power saving mode for a second period in the power savings mode having a different length than the first period in the power savings mode, where the length of the second period is a function of the first period.

In an aspect of the invention, a method of operating a transport refrigeration unit, includes operating the transport refrigeration unit in a power savings mode for a first cycle, switching the transport refrigeration unit to operate in a first mode, and operating the transport refrigeration unit in the power saving mode for a second cycle in the power savings mode having a different length than the first cycle in the power savings mode, where the length of the second cycle is based on a length of the first cycle.

BRIEF DESCRIPTION OF THE DRAWINGS

Novel features that are characteristic of exemplary embodiments of the invention are set forth with particularity in the claims. Embodiments of the invention itself may be best be understood, with respect to its organization and method of operation, with reference to the following description taken in connection with the accompanying drawings in which:

DETAILED DESCRIPTION OF EXEMPLARY EMBODIMENTS

Reference will now be made in detail to exemplary embodiments of the application, examples of which are illustrated in the accompanying drawings. Whenever possible, the same reference numerals will be used throughout the drawings to refer to the same or like parts.

Figure 1:
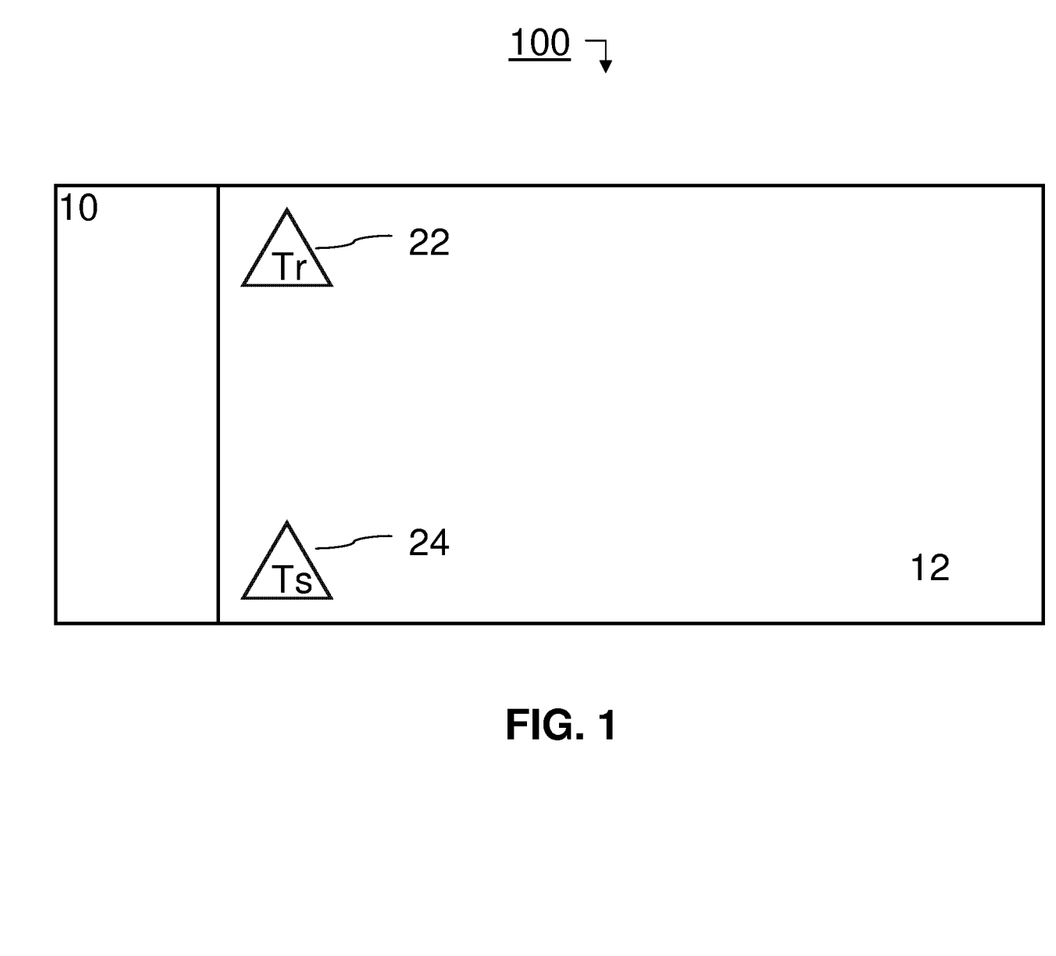
FIG. 1 is a diagram that shows an embodiment of a transport refrigeration system according to the application.

FIG. 1 is a diagram that shows an embodiment of a transport refrigeration system. As shown in FIG. 1, a transport refrigeration system 100 can include a transport refrigeration unit 10 coupled to an enclosed space within a container 12. The transport refrigeration system 100 may be of the type commonly employed on refrigerated trailers. As shown in FIG. 1, the transport refrigeration unit 10 is configured to maintain a prescribed thermal environment within the container 12 (e.g., cargo in an enclosed volume).

In FIG. 1, the transport refrigeration unit 10 is connected at one end of the container 12. Alternatively, the transport refrigeration unit 10 can be coupled to a prescribed position on a side or more than one side of the container 12. In one embodiment, a plurality of transport refrigeration units can be coupled to a single container 12. Alternatively, a single transport refrigeration unit 10 can be coupled to a plurality of containers 12. The transport refrigeration unit 10 can operate to induct air at a first temperature and to exhaust air at a second temperature. In one embodiment, the exhaust air from the transport refrigeration unit 10 will be warmer than the inducted air such that the transport refrigeration unit 10 is employed to warm the air in the container 12. In one embodiment, the exhaust air from the transport refrigeration unit 10 will be cooler than the inducted air such that the transport refrigeration unit 10 is employed to cool the air in the container 12. The transport refrigeration unit 10 can induct air from the container 12 having a return temperature Tr (e.g., first temperature) and exhaust air to the container 12 having a supply temperature Ts (e.g., second temperature).

In one embodiment, the transport refrigeration unit 10 can include one or more temperature sensors to continuously or repeatedly monitor the return temperature Tr and/or the supply temperature Ts. As shown in FIG. 1, a first temperature sensor 24 of the transport refrigeration unit 10 can provide the supply temperature Ts and a second temperature sensor 22 of the transport refrigeration unit 10 can provide the return temperature Tr to the transport refrigeration unit 10, respectively. Alternatively, the supply temperature Ts and the return temperature Tr can be determined using remote sensors.

A transport refrigeration system 100 can provide air with controlled temperature, humidity or/and species concentration into an enclosed chamber where cargo is stored such as in container 12. As known to one skilled in the art, the transport refrigeration system 100 (e.g., controller 250) is capable of controlling a plurality of the environmental parameters or all the environmental parameters within corresponding ranges with a great deal of variety of cargoes and under all types of ambient conditions.

Figure 2:
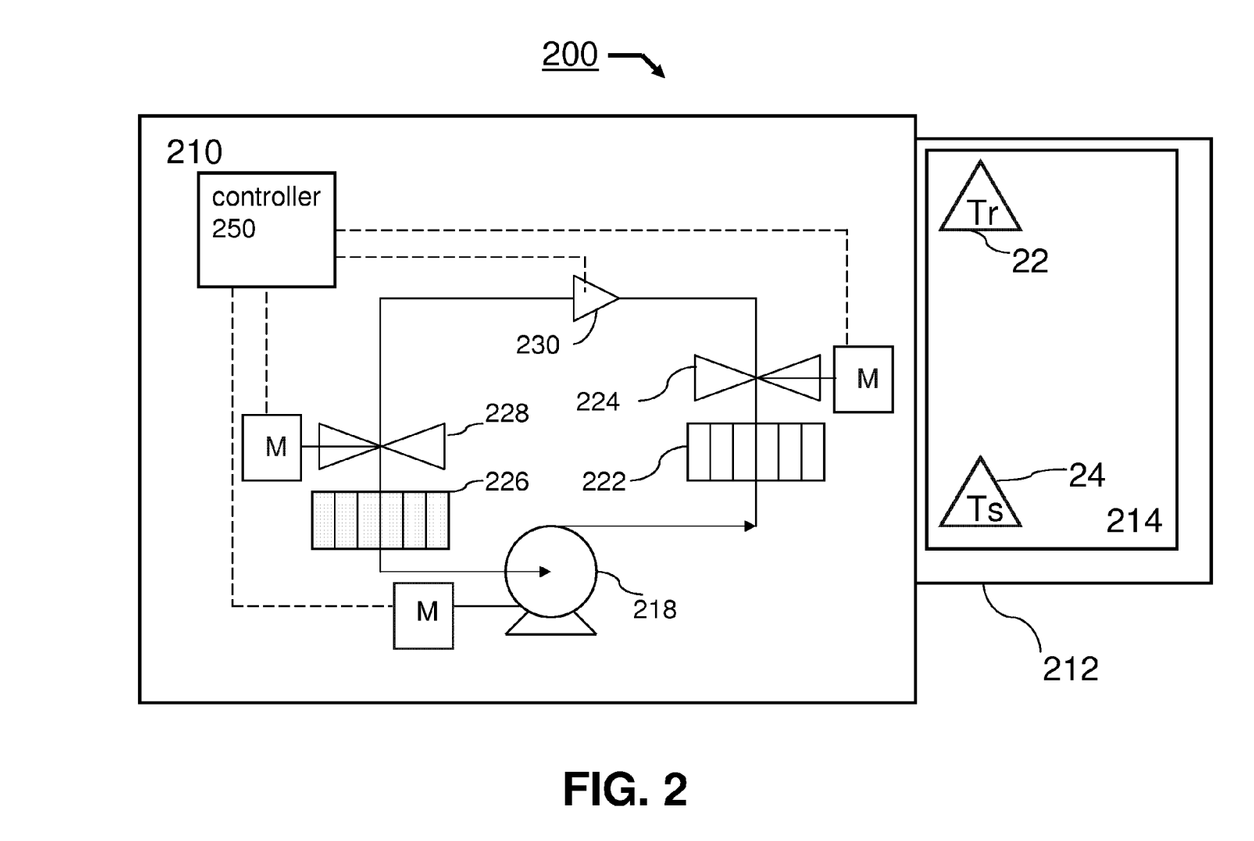
FIG. 2 is a diagram that shows an embodiment of a transport refrigeration system according to the application.

FIG. 2 is a diagram that shows an embodiment of a transport refrigeration system. As shown in FIG. 2, a transport refrigeration system 200 can include a refrigeration module 210 coupled to a container 212, which can be used with a trailer, an intermodal container, a train railcar, a ship or the like, used for the transportation or storage of goods requiring a temperature controlled environment, such as, for example foodstuffs and medicines (e.g., perishable or frozen). The container 212 can include an enclosed volume 214 for the transport/storage of such goods. The enclosed volume 214 may be an enclosed space having an interior atmosphere isolated from the outside (e.g., ambient atmosphere or conditions) of the container 212.

The refrigeration module 210 is located so as to maintain the temperature of the enclosed volume 214 of the container 212 within a predefined temperature range. In one embodiment, the refrigeration module 210 can include a compressor 218, a condenser heat exchanger unit 222, a condenser fan 224, an evaporation heat exchanger unit 226, an evaporation fan 228, and a controller 250. Alternatively, the condenser 222 can be implemented as a gas cooler.

The compressor 218 can be powered by three phase electrical power, and can, for example, operate at a constant speed. The compressor 218 may be a scroll compressor, such as, for example a scroll compressor available from Carrier Corporation of Syracuse, N.Y., USA. The transport refrigeration system 200 requires electrical power from, and can be connected to a power supply unit (not shown) such as a standard commercial power service, an external power generation system (e.g., shipboard), a generator (e.g., diesel generator), or the like.

The condenser heat exchanger unit 222 can be operatively coupled to a discharge port of the compressor 218. The evaporator heat exchanger unit 226 can be operatively coupled to an input port of the compressor 218. An expansion valve 230 can be connected between an output of the condenser heat exchanger unit 222 and an input of the evaporator heat exchanger unit 226.

The condenser fan 224 can be positioned to direct an air stream onto the condenser heat exchanger unit 222. The air stream from the condenser fan 224 can allow heat to be removed from the coolant circulating within the condenser heat exchanger unit 222.

The evaporator fan 228 can be positioned to direct an air stream onto the evaporation heat exchanger unit 226. The evaporator fan 228 can be located and ducted so as to circulate the air contained within the enclosed volume 214 of the container 212. In one embodiment, the evaporator fan 230 can direct the stream of air across the surface of the evaporator heat exchanger unit 226. Heat can thereby be removed from the air, and the reduced temperature air can be circulated within the enclosed volume 214 of the container 212 to lower the temperature of the enclosed volume 214.

The controller 250 such as, for example, a MicroLink™ 2i controller available from Carrier Corporation of Syracuse, N.Y., USA, can be electrically connected to the compressor 218, the condenser fan 224, and/or the evaporator fan 228. The controller 250 can be configured to operate the refrigeration module 210 to maintain a predetermined environment (e.g., thermal environment) within the enclosed volume 214 of the container 212. The controller 250 can maintain the predetermined environment by selectively controlling operations of the compressor 218, the condenser fan 224, and/or the evaporator fan 228. For example, if increased cooling of the enclosed volume 214 is required, the controller 250 can increase electrical power to the compressor 218, the condenser fan 224, and the evaporator fan 228. In one embodiment, an economy mode of operation of the refrigeration module 210 can be controlled by the controller 250. In another embodiment, variable speeds of components of the refrigeration module 210 can be adjusted by the controller 250. In another embodiment, a full cooling mode for components of the refrigeration module 210 can be controlled by the controller 250. In one embodiment, the electronic controller 250 can adjust a flow of coolant supplied to the compressor 218.

Refrigeration costs (e.g., power costs) are included in determining total cost of ownership (TCO) of a transport refrigeration system or transport refrigeration module. Power savings are considered in refrigeration modules and/or refrigeration container units because reduced power consumption can directly affect the cost of transporting the cargo. Power savings enhancements such as economy modes can be dependent on the temperature sensitivity or tolerance to temperature fluctuation of the cargo being transported. For example, cargoes that are chilling injury prone or cargoes that have high respiration loads may not be allowed to use selected power savings operations such as selected economy modes.

An embodiment of a method of operating a transport refrigeration system according to the application will now be described. The method embodiment shown in FIG. 3, can be implemented in and will be described using a transport refrigeration system embodiment shown in FIG. 2, however, the method embodiment is not intended to be limited thereby.

Figure 3:
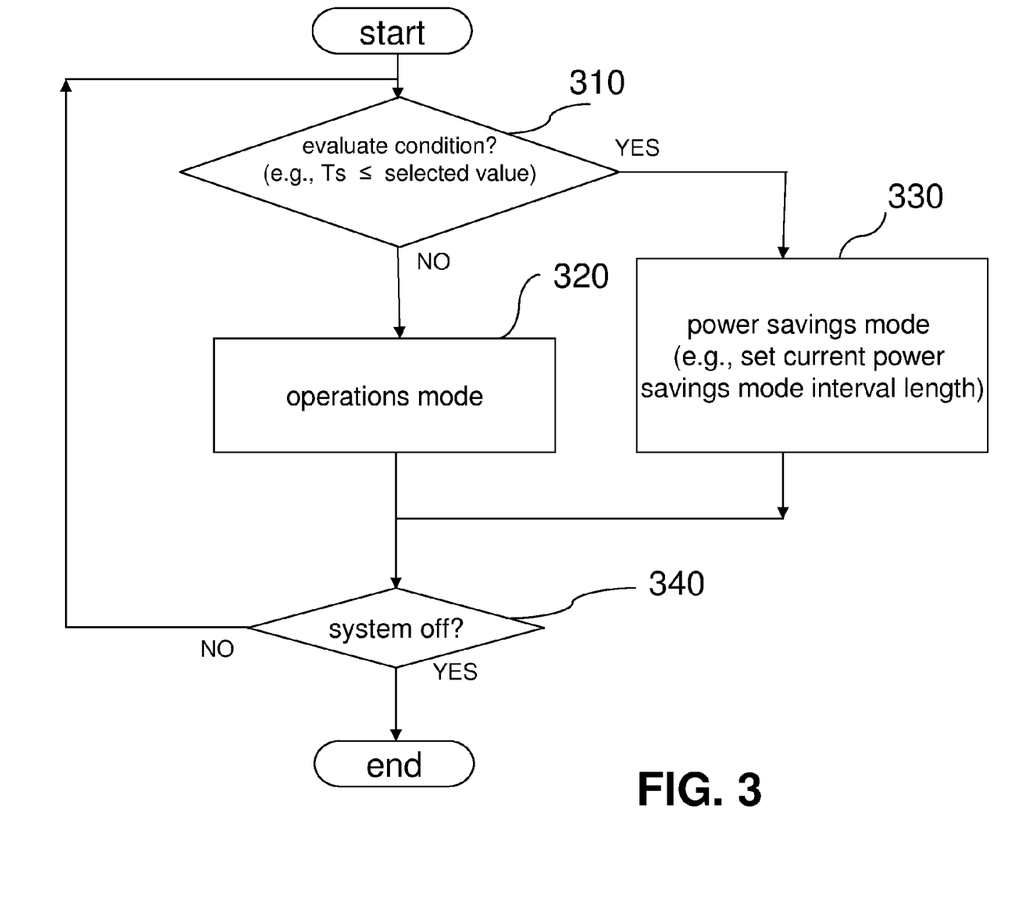
FIG. 3 is a flowchart that shows an embodiment of a method of operating a transport refrigeration system according to the application.

As shown in FIG. 3, after a process starts, it can be determined whether a transport refrigeration system 200 can be operated in a power savings mode (operation block 310). The determination to switch to the power savings mode can be based on detection of one or more conditions of the system 200 (e.g., Ts, Tr, in the container 212). When the condition(s) is satisfied, the power savings mode is selected and control passes to operation block 330, otherwise control passes to operation block 320. From either operations block 330 or operations block 320, it can be determined whether the refrigeration system 200 is operating, (operation block 340) and control can jump back to operation block 310 or a process can end. For example, the system 200 can be manually disabled in operation block 340. In one embodiment, the condition(s) in operation block 310 can be tested periodically, repeatedly, continuously, upon operator action or responsive to sensed criteria.

As shown in FIG. 3, a supply temperature Ts reading can be compared to a corresponding desired or required temperature value or set point temperature as an exemplary condition of operation block 310. When the supply temperature Ts is less than or equal to the selected value (operation block 310), a length for a current power savings mode operational interval can be determined and a power savings mode of a transport refrigeration system is entered for that long (operation block 330). Otherwise, an operations mode that is not a power savings mode such as a full cool mode is entered (operation block 320).

According to embodiments of the application, a length of a current power savings mode operational interval (operation block 330) can be variously determined. For example, a length of current power saving mode operational interval can be based on a length of at least one previous power saving mode operational interval. In one embodiment, a length for a current power saving mode operational interval is based on a length of an immediately previous power saving mode operational interval. In one embodiment, a length for a current power saving mode operational interval can be based on a length of a plurality of earlier power saving mode operational intervals. In one embodiment, a length for a current power saving mode operational interval can be based on a length of a set number (e.g., 5) of immediately prior power saving mode operational intervals (e.g., a rolling average) where the most recent prior power savings mode intervals are more influential (e.g., a weighted rolling average). In one embodiment, a length for a current power saving mode operational interval is based on a length of the at least one previous power saving mode operational interval and conditions varying in the container 212 or refrigeration module 210 (e.g., upon exiting at least one previous power saving mode operational interval). In one embodiment, a length for a current power saving mode operational interval can be based on lengths of a set number (e.g., 3) of selected prior power saving mode operational intervals having similar characteristics, for example, intervals that experienced similar refrigeration loads, ambient conditions, or the like.

Descriptions of a power savings mode according to exemplary embodiments of the application can include the transport refrigeration system 100, the refrigeration module 210 or a component of the refrigeration module 210 or a component of the transport refrigeration system 100 (e.g., controlled by the controller 250) and are variously described herein. Such embodiments are not intended to be limited to a specific or single power savings mode of operation (e.g., economy mode of operation), but are intended to include modes that reduce energy or power consumption such as but not limited to (i) operating only the evaporation fan 228 and operating the evaporation fan 228 at a reduced speed, (ii) operating the evaporation fan 228, the condenser fan 224 and compressor 218 at a reduced or low speed, (iii) operating the evaporation fan 228, the condenser fan 224 and compressor 218 individually or in combination at a variable speed; (iv) turning off the refrigeration module 210 or turning off one or more of the evaporation fan 228, the condenser fan 224 and compressor 218, (v), economy modes for perishable goods, (vi) economy modes for frozen goods, (vii) etc.

An embodiment of a method of operating a transport refrigeration system according to the application will now be described. The method embodiment shown in FIG. 4, can be implemented in and will be described using a transport refrigeration system embodiment shown in FIG. 2, however, the method embodiment is not intended to be limited thereby. The method embodiment shown in FIG. 4 can be used for perishable goods.

Figure 4:
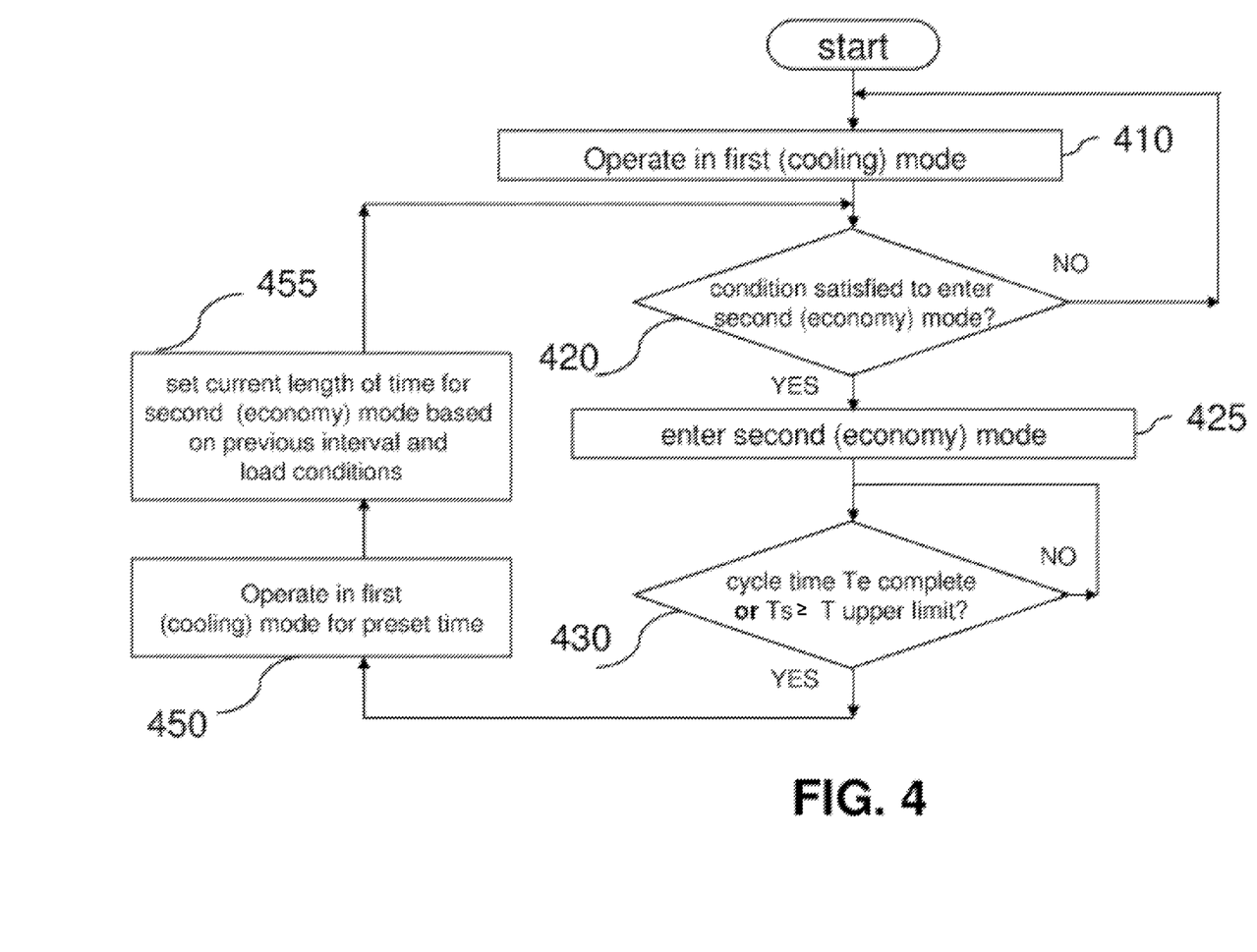
FIG. 4 is a flowchart that shows an embodiment of a method of operating a transport refrigeration system according to the application.

As shown in FIG. 4, after a process starts, a refrigeration module 210 can be operated in a cooling mode (operation block 410). In one embodiment, the refrigeration module 210 can enter a pull-down cooling mode or high cooling mode upon start-up.

Next, it can be determined whether a refrigeration module unit 210 can be operated in an economy mode (operation block 420). The determination can be based on detection of a condition indicating it is safe to operate in the economy mode. When the determination in operation block 420 is affirmative, refrigeration module unit 210 can enter a second mode or economy mode (operation block 425), otherwise control returns to operation block 410. In one embodiment, the condition in operation block 420 can be tested periodically, repeatedly, continuously, upon operator action or responsive to sensed criteria.

In one embodiment, determination for entry into an economy mode from a cooling mode can use refrigeration load detection logic to identify when a pre-condition for entering the economy mode is satisfied. For example, the pre-condition for entering the economy mode can be a difference between the return temperature Tr and the supply temperature Ts below a set value while operating in the cooling mode (e.g., a control cooling mode or high speed evaporator fan). Thus, |Tr−Ts|<K tolerance can be the pre-condition, that when satisfied, transitions the refrigeration module 210 into economy mode. For example, K tolerance can be a value such as 3° C., 1° F., 0.5° C. or 0.25° F.

In one embodiment, a condition for entering the economy mode can use the supply temperature Ts. For example, the supply temperature Ts reading can be compared to a corresponding selected value or range. In one embodiment, when the supply temperature Ts is less than a threshold value (e.g., a set point temperature Tsp), the condition is satisfied (operation block 420). In one exemplary economy mode, the low speed for the evaporator fan 228 can be used in operation block 430, which will result in power savings. In another embodiment, a condition in operation block 420 can include a plurality of conditions such as Ts is within a prescribed temperature range, Ts≤T upperlimit and (Tr−Ts)≤T setlimit.

As shown in FIG. 4, each entry into the economy mode can be a variable length cycle time Te (operation block 430). In one embodiment, an initial period (e.g., length of the cycle time Te) for the economy mode can be preset. Upon completion of the cycle time Te in the economy mode, control passes to operation block 450 where the cooling mode is entered (e.g., for a fixed or minimum duration). Next, the cycle time Te for the economy mode (e.g., next economy mode) can be determined based on at least one previous economy mode cycle (operation block 455). In one embodiment, the cycle time Te is a function of one or more previous cycle times or a function of previous cycle time(s) and optional additional conditions. Then, the condition can be monitored again to determine when the economy mode can be re-entered (operation block 420).

As described herein, a calculated time for a next cycle of the economy mode can be determined using the length of a previous cycle in the economy mode. In one embodiment, the supply temperature Ts can be compared to a threshold value in operation block 455. For example, the threshold value or threshold temperature Tth can be 28° F. When the supply temperature Ts is less than Tth, upon completing the previous cycle time Te, the next cycle time Te can be increased in operation block 455. When the supply temperature Ts is greater than Tth upon completing the previous cycle time Te, the next cycle time Te can be decreased in operation block 455. In one embodiment, a next economy mode cycle time Te can be stepwise increased or decreased (e.g., 2 minutes).

In another embodiment, the supply temperature Ts could be compared to a temperature range (operation block 455). For example, an increase in the supply temperature Ts during the previous cycle time Te can be compared to a prescribed or maximum temperature rise range. A ratio of the prescribed range for the supply temperature Ts to the actual rise in the supply temperature Ts during a previous cycle time Te can be used to determine (e.g., as a linear or nonlinear multiplier) the length of the next cycle time Te.

The refrigeration load can include ambient conditions, cargo respiration load, refrigeration module 210 components generated heat (e.g. evaporator fan 228) and/or replacement air for the enclosed volume 214. A majority of the refrigeration load can be substantially proportional to the difference in average return temperature and average supply temperature readings.

In one embodiment, comparison of a current refrigeration load to the prior economy mode refrigeration load can be used in addition to secondarily modify the duration (e.g., increase or decrease) of the current economy mode cycle. Thus, the calculated time for a length of a current cycle time Te for the economy mode can also reflect changes in ambient temperature conditions.

In one embodiment, the supply temperature Ts can be monitored during the cycle time Te in the economy mode (operation block 430). The supply temperature Ts can be compared to an upper threshold temperature (e.g., T upper limit) The upper limit temperature (T upper limit) can be set based on the cargo. Such a temperature check in the economy mode can reduce chances of or prevent an occurrence where temperature increases in the enclosed volume 214 or the cargo is damaged. The process shown in FIG. 4 can continue until the system 200 is turned off or the economy mode enable feature is turned off.

The first cooling mode can be entered after completion of an economy mode cycle (e.g., operation block 450) to increase accuracy in determining conditions in the container 12 or to improve reliability of measurements such as the supply temperature Ts, the return temperature Tr, and the like. Exemplary values for a preset time in operation block 450 can include ten minutes, five minutes, three minutes, or one minute. In one embodiment, measurements in operation block 450 could be taken repeatedly, intermittently, periodically, upon operation action or until a change in conditions is less than a threshold amount between two different measurements. For example, operation block 450 could be operative until a change in supply temperature Ts is less than a specified value (e.g., 0.5° F.) between two consecutive recordings.

An embodiment of a method of operating a transport refrigeration system according to the application will now be described. The method embodiment shown in FIG. 5, can be implemented in and will be described using a transport refrigeration system embodiment shown in FIG. 2, however, the method embodiment is not intended to be limited thereby. The method shown in FIG. 5 can be used for frozen goods.

Figure 5:
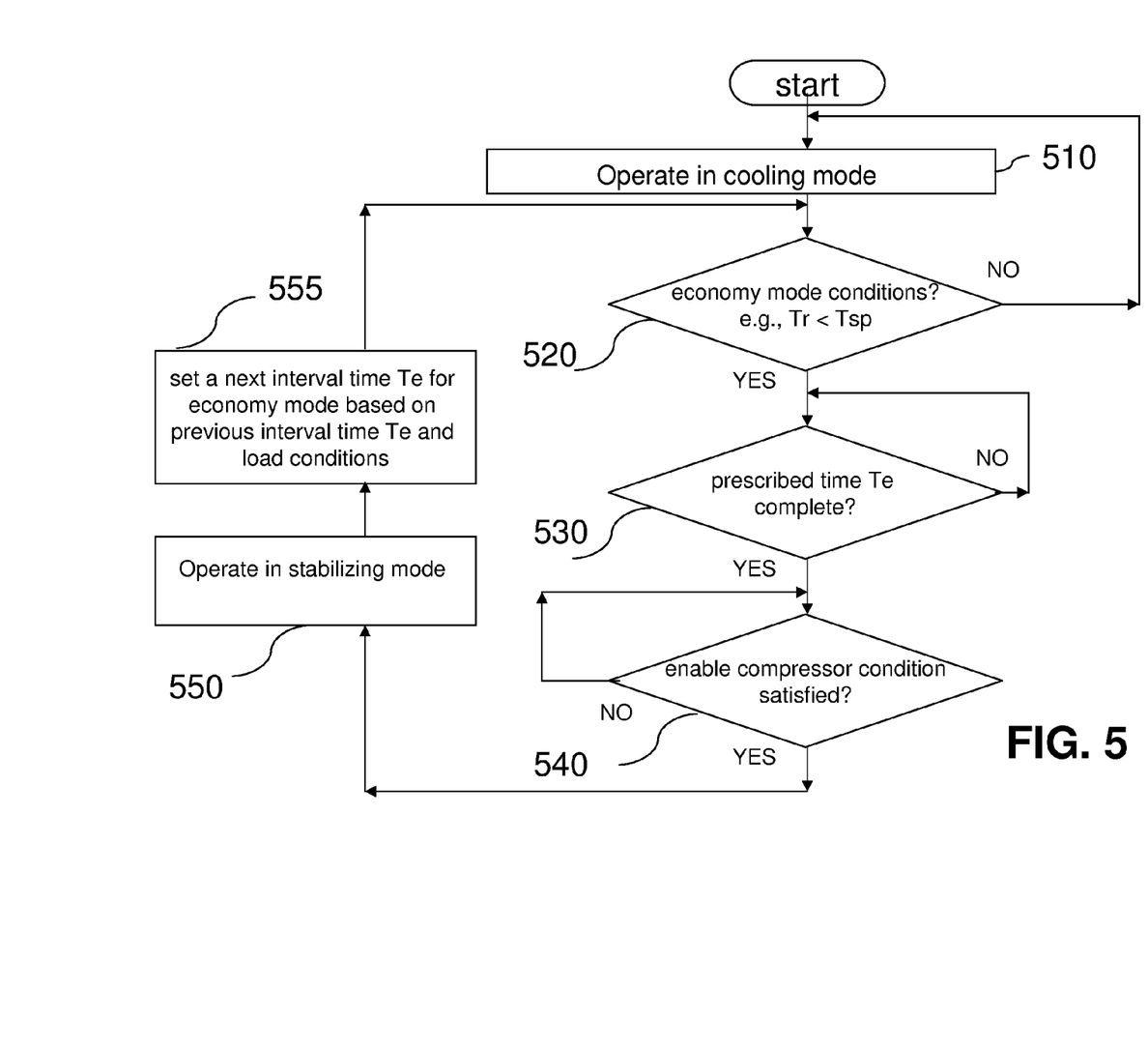
FIG. 5 is a flowchart that shows an embodiment of a method of operating a transport refrigeration system according to the application.

As shown in FIG. 5, after a process starts, a refrigeration module 210 can be operated in a cooling mode (operation block 510). In the cooling mode, the transport refrigeration system 200 is operative to reduce a temperature of the enclosed volume 214, for example, to a set point temperature. In one embodiment, the refrigeration module 210 can enter a pull-down cooling mode or high cooling mode upon start-up in operation block 510.

In the cooling mode, it can be determined by monitoring a selected condition when a transport refrigeration system 200 can be switched into an economy mode (operation block 520). As shown in FIG. 5, the economy mode can be entered when the return temperature Tr is less than a threshold value (e.g., a set point temperature Tsp). For example, the set point temperature Tsp can be between 10° F. to 30° F. However, the set point temperature Tsp can be higher or lower. When the economy mode is selected, control passes to operation block 530, otherwise control returns to operation block 510. In one exemplary economy mode, the fans and compressor in the refrigeration module 210 can be turned off. When the evaporator fan 228 is off, return and supply temperatures Tr, Ts are invalid. In one exemplary economy mode, only the evaporator fan 228 may operate at a low speed.

The economy mode can be maintained for an interval or cycle time Te (operation block 530). Upon completion of the interval time Te in the economy mode, a stabilizing mode can be entered for detecting conditions at the refrigeration module 210 (e.g., Ts, Tr), conditions in the enclosed volume 214 or the container 212, or estimating a current refrigeration load (operation block 550). In one embodiment, the stabilizing mode can operate a high speed evaporator fan 224 while the compressor 218, the condenser 226, and the condenser fan 228 are off. In one embodiment, the stabilizing mode is entered for a fixed time in operation block 550.

Operation block 550 can operate similar to operation block 450 to increase accuracy or improve reliability of measurements used to set a next interval time Te. Then, a next interval time Te for the economy mode can be variously determined based on at least one previous interval time Te in the economy mode (operation block 555). Then, control can return to operation block 520. The process shown in FIG. 5 can continue until manually or automatically exited or the transport refrigeration system 200 is turned off.

In operation block 555, the desired or optimum next time Te in economy mode can be determined based on a correlation to the previous time Te in economy mode. For example, a time weighted average of estimated ambient temperature readings for the next economy mode cycle could be used in refrigeration load estimation for the next economy mode cycle. The estimated refrigeration load computation could be compared to the refrigeration load experienced by the previous economy mode cycle to determine the duration (e.g., increase or decrease) of next economy mode cycle. For example, the estimated change in refrigeration load can be used to linearly/nonlinearly increase/decrease in the next economy mode cycle time Te. Further, upon determination of the next time Te in economy mode, a rolling or weighted average can be used by averaging that next time Te in economy mode with a set number (e.g., 4) of actual previous times Te in economy mode to reach a final next time Te in economy mode. In one embodiment, a refrigeration load for frozen goods can be approximately proportional to the difference in average ambient temperature and the set point using the return temperature Tr.

For example, when only an ambient temperature increase of 10° F. is different from a previous cycle time Te in the economy mode to determine a next cycle time Te, the length of the previous cycle time can be stepwise increased and used on the next cycle time Te. Alternatively, an estimated change in refrigeration load can be used to modify (e.g., as a multiplier) the previous cycle time Te to a next cycle time Te.

In order to operate in the cooling mode shown in operation block 550, the compressor 218 must be enabled. However, in selected economy modes, at least the compressor 218 and the condenser fan 224 are turned off. To safely enable the compressor 218, the condenser fan 224 must be operating at a first low speed or a second high speed that are both faster than a threshold or minimum speed. To determine whether the condenser fan 224 is operating above a threshold speed, a refrigeration module 210 characteristic such as a characteristic of a motor M that drives the condenser fan 224 or the condenser fan 224 can be used to determine the condenser fan is operating above a threshold speed. In an induction motor, for example, the current drops rapidly to a rated value proportional to the motor speed. In the condenser fan 224, the motor speed can be indicative of the fan speed. Thus, in one embodiment, a current drawn by the condenser motor can be used. At the threshold speed of the condenser fan 224, the current drawn by the condenser motor can be a fraction (e.g., ½, ⅕, ⅙, 1/10) of an upper limit current (e.g., a start-up current of an induction motor) or a fraction of a current drawn at a very low speed (e.g., 100 revolutions per minute). Alternatively, the current drawn at the threshold speed of the condenser fan 224 can be less than a prescribed amount such as 2 amps, less than 1.5 amps, or less than 1 amp. As known to one skilled in the art, such exemplary values may be varied by the type of compressor or type of condenser motor or the like.

In one embodiment, when it is detected that the unit current drawn by the condenser motor is less than or equal to 1.5 amps, the monitored condition (operation block 540) is satisfied and the compressor operation can be started (e.g., the compressor contactor is energized). According to embodiments, the compressor motor can be started without waiting for a fixed timer to elapse, which can reduce or eliminate wasted condenser fan power (e.g., rated 550 W) during such a wait time.

Although described using an exemplary condenser motor configured to drive a condenser fan, embodiments of the application are not intended to be so limited. For example, any component(s) of a transport refrigeration system enabled for a fixed time period (e.g., evaporator fan) to provide sufficient time (e.g., longest time delay scenario) for a corresponding motor to be enabled or to reach a rated speed, according to embodiments of the application can reduce or change the fixed time to a reduced interval according to a monitored characteristic (e.g., current drawn) of the motor. Accordingly, transport refrigeration system power consumption can be reduced.

According to embodiments of the application, as described herein, a length of subsequent economy mode intervals can be based on a length of at least one previous economy mode interval and optional additional criteria. According to embodiments of the application, a length of subsequent cycle times in the economy mode can be based on a length of a previous cycle time Te in the economy mode, an immediately previous cycle Te, a plurality of previous cycle times, at least one previous cycle time Te and refrigeration load conditions, or selected previous cycle times having similar ambient conditions. In one embodiment, a length for a next cycle time Te is based on a length of the immediately previous cycle time Te and conditions in the container 12 (e.g., a refrigeration load) or refrigeration module 210 (e.g., Ts) upon exiting the immediately previous economy operation mode interval.

With the increase of fuel cost, there is increasing demand to reduce or minimize power consumption without compromising cargo quality. A variable length for an economy mode cycle may allow embodiments of transport refrigeration systems and operating methods thereof to reduce fuel usage while preserving cargo quality.

In exemplary embodiments, a cycle time Te for a next economy mode was determined after operating in a cooling mode (e.g., operation block 455), after exiting the economy; however, embodiments are not intended to be so limited. For example, such determinations can occur at different times, such as just before entering or leaving the economy mode (e.g., operation block 430).

In one embodiment, the determination for entry into an economy mode from a cooling mode can use refrigeration load detection logic to identify when the condition for entering the economy mode is satisfied. However, other conditions or processes for selectively entering the economy mode can be used.

Embodiments of the application have been described herein with reference to a heat evaporation type heat exchanger. However, embodiments of the application are not intended to be so limited. For example, embodiment of the application may be configured to use a heat absorption type heat exchanger. Embodiments of the application can improve transport conditions for transport refrigeration modules and methods thereof relative to a fixed length economy mode.

In one embodiment of the refrigeration module 10 (e.g., as shown in FIG. 2), the condenser fan 224 can be replaced by a first circulating fluid heat exchanger and the evaporator fan 228 can be replaced by a second circulating fluid heat exchanger. The first circulating fluid heat exchanger can be thermally coupled to the condenser heat exchanger unit 222 to remove heat from the coolant and transfer the heat to a second circulating fluid. The second circulating fluid heat exchanger can be thermally coupled to the evaporator heat exchange unit 226 to transfer heat from a third circulating fluid within the second circulating fluid heat exchanger to the coolant within the evaporator heat exchange unit 226.

The container 12 illustrated in FIG. 1 may be towed by a semi-truck for road transport. However, those having ordinary skill in the art will appreciate that exemplary containers according to embodiments of the application is not limited to such trailers and may encompass, by way of example only and not by way of limitation, trailers adapted for piggy-back use, railroad cars, and container bodies contemplated for land and sea service.

Embodiments according to the application can use remote sensors to respectively measure an environment within the container 12 such as the return air temperature Tr and the supply air temperature Ts. Remote sensors, as known to one skilled in the art, can communicate with a controller (e.g., transport refrigeration unit 10) through wire or wireless communications. For example, wireless communications can include one or more radio transceivers such as one or more of 802.11 radio transceiver, Bluetooth radio transceiver, GSM/GPS radio transceiver or WIMAX (802.16) radio transceiver. Information collected by remote sensor(s) can be used as input parameters for a controller to control various components in transport refrigeration systems. In one embodiment, remote sensors may monitor additional criteria such as humidity, species concentration or the like.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment.

We claim:

1. A transport refrigeration unit for regulating the temperature of an enclosed volume, the transport refrigeration unit comprising:
a refrigeration module operatively coupled to said enclosed volume, said refrigeration module including:
a supply port to output air to said enclosed volume at a supply temperature;
a return port to return air from said enclosed volume to the refrigeration module at a return temperature;
at least one component configured to operate in a first cooling mode and an economy mode; and
a controller configured to change a length of a subsequent operating interval for said at least one component in said economy mode based on at least one previous operating interval of said at least one component in said economy mode.

2. The transport refrigeration unit of claim 1, said controller configured to set a second interval in said economy mode to be less than said first interval when said supply temperature is above a prescribed threshold after exiting a first interval in said economy mode and to set said second interval in said economy mode to be greater than said first interval when said supply temperature is below said prescribed threshold after exiting the first interval in said economy mode.

3. The transport refrigeration unit of claim 1, said controller configured to set a next (n+1) interval in said economy mode equal to one of 90% of a current (n) interval, said current (n) interval minus a prescribed period of time, or said current (n) interval minus 5 minutes when said supply temperature is above a prescribed threshold after exiting the current (n) interval in said economy mode, said controller configured to set said next (n+1) interval in said economy mode equal to one of 110% of said current (n) interval, said current (n) interval plus said prescribed period of time, or said current (n) interval plus 5 minutes when said supply temperature is below said prescribed threshold after exiting the current (n) interval in said economy mode.

4. The transport refrigeration unit of claim 1, said controller configured to set an averaged next (n+1) interval in said economy mode by averaging m previous intervals in economy mode, wherein said averaged next (n+1) interval in said economy mode is equal to ((said next (n+1) interval in economy mode + a current (n) interval in said economy mode + . . . + said mth previous (n+1−m) interval in said economy mode)/m).

5. The transport refrigeration unit of claim 1, said controller configured to set an averaged (n+1) interval in said economy mode by weight averaging m previous intervals in economy mode, wherein said averaged (n+1) interval in said economy mode is equal to (((w1*(n+1) interval)+ (w2*(n) interval) + . . . + (wm*(n+1−m) interval))/m) where w1, w2, . . . wm are weighting factors and w1>w2> . . . >w(m−1)>wm.

6. The transport refrigeration unit of claim 1, said controller configured to determine an increase in said supply temperature that occurred during a first interval in the economy mode as a percentage of a prescribed increase range, wherein an inverse of the percentage is used to modify a length of said first interval to determine a length of a second interval in the economy mode.

7. The transport refrigeration unit of claim 1, said controller configured to determine an increase in said supply temperature that occurred during a first interval in the economy mode as a percentage of a prescribed increase range, wherein the percentage is a linear multiplier, nonlinear multiplier or linear function of a length of said first interval to set a length of a second interval in the economy mode.

8. The transport refrigeration unit of claim 1, said controller configured to determine a prescribed temperature or a temperature difference between said supply temperature and said prescribed temperature in the first cooling mode after exiting a first interval in said economy mode, said controller configured—to determine said temperature difference a prescribed time after exiting said first interval in the economy mode, intermittently after exiting said first interval, repeatedly after exiting said first interval, or periodically after exiting said first interval, said controller configured to set a length of a second interval in said economy mode greater than said first interval when said temperature difference is below a prescribed threshold, said controller configured to set said second interval in said economy mode less than said first interval when said temperature difference is above the prescribed threshold.

9. The transport refrigeration unit of claim 1, said controller configured to determine a length of a next interval in the economy mode for said component based on (i) a determined length of one or more selected previous operation intervals in the economy mode for said component and (ii) a temperature difference between said supply temperature and said return temperature determined in the first cooling mode after leaving the economy mode in one previous operation intervals, or (iii) a determined refrigeration load.

10. The transport refrigeration unit of claim 9, wherein said determined length is an averaged length of each of a first set of immediately previous operation intervals in the economy mode for said component, an averaged length of each of a second set of selected previous operation intervals having similar ambient characteristics or an averaged length of each of a third set of selected previous operation intervals in the economy mode for said component,
and wherein said determined refrigeration load is based on at least one of (i) ambient conditions, changes to a current cargo, changes to a current enclosed volume, respiration load of the current cargo or heat generated by said component.

11. The transport refrigeration unit of claim 1, said refrigeration module including:
a compressor having an input and an output;
a condenser heat exchanger unit operatively coupled to said output;
an evaporator heat exchanger unit operatively coupled to said input;
a condenser fan disposed proximate to said condenser heat exchanger unit; and
an evaporator fan disposed proximate to said evaporator heat exchanger unit, said controller configured to regulate the operation of said compressor, said condenser fan, and said evaporator, said component being at least one of said compressor, said condenser fan, or said evaporator fan, said controller configured to determine a temperature difference between said supply temperature and said return temperature in the first mode after exiting a first interval in said economy mode.

12. The transport refrigeration unit of claim 1, wherein said economy mode is first power savings mode where the component is off or a second power savings mode where the component operates in a low speed mode, and the first mode is an operational mode or full cool mode.

13. The transport refrigeration unit of claim 12, wherein upon exiting the first power savings mode, a characteristic of a motor of a heat exchanger fan unit is monitored, and wherein a compressor is enabled based on the monitored characteristic.

14. The transport refrigeration unit of claim 13, wherein the monitored characteristic is current drawn by the motor, wherein the motor is a condenser fan motor, and wherein the compressor is enabled when the current drawn is less than a prescribed value, less than 2 amps, less than 1.5 amps or is less than 1 amp.

15. The transport refrigeration unit of claim 1, wherein the controller is configured to operate the component in the first mode until a sensed temperature is less than a first selected value and to exit the economy mode when the sensed temperature is not less than a second selected value.

16. The transport refrigeration unit of claim 1, said controller configured to selectively operate said refrigeration module in said economy mode when $Ts<Tc1$, where Ts is a supply temperature and Tc1 is a set value or when $Tr<Tc2$, where Tr is a return temperature and Tc2 is a set value.

17. A computer program product comprising a non-transitory computer usable storage medium to store a computer readable program that, when executed on a computer, configures the computer to perform operations to operate a transport refrigeration unit, the operations comprising:
   operate the transport refrigeration unit in a power savings mode for a first period;
   switch the transport refrigeration unit to operate in a first mode; and
   operate the transport refrigeration unit in the power saving mode for a second period in the power savings mode having a different length than the first period in the power savings mode, wherein the length of the second period is a function of the first period.

18. The computer program product of claim 17, wherein the computer readable program, when executed on the computer, configures the computer to perform operations, the operations comprising:
   set the second period in said power saving mode less than said first period when said supply temperature is above a prescribed threshold after exiting the first period in said power saving mode; and
   set said second period in said power saving mode greater than said first period when said supply temperature is below said prescribed temperature after exiting the first period in said power saving mode.

19. A method of operating a transport refrigeration unit, comprising:
   operating the transport refrigeration unit in a power savings mode for a first cycle;
   switching the transport refrigeration unit to operate in a first mode; and
   operating the transport refrigeration unit in the power saving mode for a second cycle having a different length than the first cycle in the power savings mode, wherein the length of the second cycle is based on a length of the first cycle.

* * * * *